United States Patent [19]
Cline

[11] Patent Number: 5,638,696
[45] Date of Patent: Jun. 17, 1997

[54] ABSORPTION REFRIGERATION SYSTEM

[76] Inventor: Calvin D. Cline, 1301 Ranger Hwy., Weatherford, Tex. 76086

[21] Appl. No.: 586,630

[22] Filed: Nov. 15, 1995

[51] Int. Cl.$^6$ .............................. F25B 17/00; F25B 27/00
[52] U.S. Cl. ............................................. 62/481; 62/323.2
[58] Field of Search ........................... 62/476, 477, 481, 62/482, 240, 238.3, 323.2

[56] References Cited

U.S. PATENT DOCUMENTS

| | | | |
|---|---|---|---|
| 1,345,001 | 6/1920 | Gibbs | 62/477 |
| 1,717,173 | 6/1929 | Slager | 62/477 |
| 2,131,119 | 9/1938 | Root et al. | 62/477 |
| 2,746,272 | 5/1956 | Carpenter | 62/240 |
| 3,585,810 | 6/1971 | Sander et al. | 62/144 |
| 3,721,104 | 3/1973 | Adler | 62/240 |
| 4,018,694 | 4/1977 | Anderson | 252/69 |
| 4,484,456 | 11/1984 | Reimann | 62/476 |
| 4,589,262 | 5/1986 | Nagao | 62/141 |
| 4,662,191 | 5/1987 | Furutera et al. | 62/476 |
| 4,744,224 | 5/1988 | Erickson | 62/235.1 |
| 5,333,471 | 8/1994 | Yamada | 62/476 |
| 5,473,879 | 12/1995 | Jones | 62/480 |

*Primary Examiner*—William Doerrler
*Attorney, Agent, or Firm*—Charles D. Gunter, Jr.

[57] ABSTRACT

An improved absorption refrigeration system is shown which includes an evaporator which evaporates a refrigerant to form a refrigerant vapor by depriving a chill carrier fluid of its heat. An absorber section cycles between an absorption state in which the refrigerant vapor received from the evaporator is absorbed into a liquid absorbent, a heating state in which diluted absorbent is concentrated by heating to evaporate the refrigerant content thereof as refrigerant vapor, and an intermediate cooling state. A condenser condenses the refrigerant vapor received from the absorber section, thereby transforming condensed vapor into a high pressure liquid which is returned to the evaporator unit in a closed loop absorption refrigeration cycle.

10 Claims, 5 Drawing Sheets

ABSORPTION REFRIGERATION SYSTEM

BACKGROUND OF THE INVENTION

1. Field of the Invention

The present invention relates to absorption refrigeration systems and, more specifically, to such systems using ammonia as the refrigerant and water as the absorbent.

2. Description of the Prior Art

Absorption refrigeration systems are well known in the art and typically comprise a generator, a condenser, an evaporator and an absorber interconnected to provide paths of flow for the refrigerant and the absorbent. The solution of refrigerant and absorbent in the generator is heated to expel refrigerant vapor therefrom. The expelled vapor is then delivered to the condenser where it is condensed to a liquid by transfer of its heat of vaporization to an ambient medium at a lower temperature. The liquid refrigerant from the condenser is delivered to the evaporator where it evaporates at a relatively low pressure. The evaporation of refrigerant at the low pressure and temperature produces the refrigerating effect.

The relatively hot absorbent from which the refrigerant has been expelled in the generator (absorbent weak in refrigerant) is then cooled and delivered to the absorber. The cool absorbent weakened refrigerant in the absorber has a high affinity for refrigerant vapor and absorbs vapor from the evaporator in open communication therewith to maintain the relatively low pressure and temperature in the evaporator.

The absorbent into which the refrigerant vapor has been absorbed (solution strong in refrigerant) is then delivered back to the generator by a pump, or other means, and the cycle is repeated. Thus, the generator and condenser operate at a relatively high pressure while the evaporator and absorber operate at a relatively lower pressure. Restricting means are typically provided between the high and low pressure sides of the system which together with the solution pump maintain the difference in the pressures in the two sides of the system.

The use of heat exchangers, analyzers and rectifiers is also well known in absorption refrigeration systems to improve their efficiency. The heat exchanger transfers heat between the relatively hot absorbent weakened refrigerant flowing from the generator to the absorber and the relatively cool absorbent strong in refrigerant flowing from the absorber to the generator. The analyzer directly contacts the relatively cool absorbent strong in refrigerant in counter-flow with the relatively hot refrigerant vapor flowing from the generator to the condenser to separate liquid absorbent from the expelled refrigerant vapor to improve the quality of the refrigerant vapor entering the condenser. The rectifier transfers heat from the refrigerant vapor exiting the analyzer to a cooler solution in a heat exchanger to further reduce the amount of refrigerant vapor delivered to the condenser and again increase the quality of refrigerant vapor entering the condenser.

Absorption-type refrigeration systems accomplish cooling effects in a comparable manner to that described for the typical compression-type refrigeration system. The evaporator, condenser and throttling device are substantially similar in the two systems. However, a major distinction between the two systems is in the method used to increase refrigerant pressure between the condenser and the evaporator. In the compression-type system, the increase in pressure is accomplished by a mechanical means, namely the compressor. In the absorption-type system, the increase in pressure is brought about by means of heating an absorbent/refrigerant fluid, such as a water/ammonia mixture. The absorption refrigeration system is based upon the phenomenon of the absorption of ammonia vapor by water at lower temperatures and the expulsion of ammonia vapor when the water/ammonia mixture is heated.

The absorption refrigeration system has certain advantages over compression-type refrigeration systems. For example, the typical compressor used in compression-type systems has a number of moving mechanical parts and is somewhat noisy. The absorption refrigeration system, lacking the compressor, significantly reduces the noise level of the system. Maintenance requirements are also reduced, since there are no moving compressor parts to wear out or require regular maintenance.

A number of industries could benefit from the use of absorption-type refrigeration systems, except for limitations primarily dealing with the generator or primary heat source for the generator used in such systems. In the part, the primary heat source was usually provided by steam, gas burners, or electrical resistance heaters. For example, U.S. Pat. No. 4,914,919 shows an absorption refrigeration system operated by a heating cartridge from at least one electric current source or by a gas burner. Similarly, U.S. Pat. No. 4,487,030 shows another absorption refrigeration system which is operated by electrical resistance heaters or by flammable gas burners.

The practical use of these prior art absorption refrigeration systems was significantly limited due to several disadvantages associated with such heat sources used by the generator. In particular, the overall system efficiency of most of these prior art systems which used relatively inefficient generator heat sources was appropriately low in comparison to the system efficiency of most non-absorption-type refrigeration systems. In addition, most of the heating sources used by the generator in these prior art absorption systems required frequent and costly maintenance.

One industry which is in need of an absorption refrigeration system of low cost and maintenance and increased efficiency is the fishing industry, for example, shrimp boats. These boats take in fresh catch which could, preferentially, be flash-frozen on the boat while on the water, and stored in a refrigerated hold of the boat if an adequate refrigeration system was available at an economical cost.

A need exists to provide an absorption refrigeration system for this and other uses which provides increased efficiency of operation while decreasing the amount of routine maintenance which must be performed on the system.

A need exists to provide such an absorption refrigeration system which is more thermally efficient and yet which is cost effective and competitive with existing compression refrigeration systems in price.

Accordingly, it is an object of the present invention to provide a high efficiency absorption refrigeration system and method which is cost effective and low in maintenance.

SUMMARY OF THE INVENTION

The improved absorption refrigeration system of the invention includes an evaporator section in which a refrigerant is caused to evaporate in an evaporator unit to form a refrigerant vapor by depriving a chilled carrier fluid of its heat. The system also includes an absorber section which is cyclable between an absorption state in which the refrigerant vapor received from the evaporator unit is absorbed into a liquid absorbent to form a diluted absorbent with attendant heat generation, a heating state in which the dilute absorbent is concentrated by heating the same with a heating fluid to evaporate the refrigerant content thereof as a refrigerant vapor, and an intermediate cooling state. The system also includes a condenser section for condensing the refrigerant vapor received thereinto from the absorber section when the section is in the heating state, whereby the condensed vapor is transformed to a high pressure liquid which is returned to the evaporator unit in a closed loop absorption refrigeration cycle.

Preferably, the absorber section is comprised of at least three absorbing/reclaiming units, each absorbing reclaiming unit being cyclable between:

(a) an absorption state in which the refrigerant vapor received from the evaporator unit is absorbed into a liquid absorbent to form a diluted absorbent;

(b) a heating state in which the diluted absorbent is concentrated by heating the same by indirect contact with a heating fluid in heat exchange relationship to evaporate the refrigerant content thereof as a high pressure vapor;

(c) A cooling state for absorbing the heat generated by another of the three absorbing/reclaiming units when that another unit is in the heating state.

Each of the absorbing/reclaiming units is preferably a vessel having a top end and a bottom end and a length defined along a longitudinal axis therebetween. Each vessel has a width which is less than the length thereof, an initially open interior and an exterior. The longitudinal axis of each of the vessels is oriented vertically with respect to a surrounding support surface when in operation.

Each vessel interior contains a plurality of internal tubes which run longitudinally between the bottom end and top end thereof and form heat exchange surfaces with respect to the vessel interior. The internal tubes are supported in each vessel interior by means of a series of perpendicularly-arranged baffle plates, the baffle plates having apertures therein for allowing the passage of vapor within the vessel interior as a heat exchange fluid passes through the tubes. Preferably, the refrigerant vapor is ammonia and the absorbent liquid in the system is water.

The invention also includes a method of refrigerating a desired area of a boat, the boat having a boat engine and being afloat in a body of water, the boat engine being cooled by means of a keel cool outlet and a keel cool return for circulating cooling water from the boat engine along a keel cool line running along a bottom exterior surface of the boat. The refrigeration system shown in the method is capable of cooling the desired area of the boat to at least 0° F.

The method comprises the steps of installing an absorption refrigeration system on the boat, including:

(a) an evaporator section in which a refrigerant is caused to evaporate in an evaporator unit to form a refrigerant vapor by depriving a chilled carrier fluid of its heat;

(b) an absorber section comprised of at least three absorbing/reclaiming units, each absorbing/reclaiming unit being cyclable between:

(i) an absorption state in which the refrigerant vapor received from the evaporator unit is absorbed into a liquid absorbent to form a diluted absorbent;

(ii) a heating state in which the diluted absorbent is concentrated by heating the same by indirect contact with a heating fluid and heat exchange relationship to evaporate the refrigerant content thereof as a high pressure vapor;

(iii) a cooling state for absorbing the heat generated by another of the three absorbing/reclaiming units when that another unit is in the heating state; and (c) a condenser section for condensing the high pressure vapor received thereinto from the absorbing/reclaiming unit previously in the heating state, whereby the condensed vapor is transformed to a high pressure liquid which is returned to the evaporator unit in a closed loop absorption refrigeration cycle.

In the method of the invention, heat is supplied to the absorption refrigeration system in order to heat the absorbing/reclaiming unit which is in the heating state by utilizing exhaust heat from the boat engine, thereby eliminating the need for a separate generator portion of the absorption refrigeration system apart from the engine exhaust heat. Hot water from an engine heat exchanger on the boat engine is routed to the absorption refrigeration system to supply heat to the system and from the absorption refrigeration system through an engine keel cool circuit including a keel cool line running along a bottom exterior surface of the boat. Preferably, the boat is a fishing boat and the desired area which is cooled is a hold of the boat which contains freshly-caught fish. The hold is maintained according to the method of the invention at a temperature of about 0° F. or below.

Additional objects, features and advantages will be apparent in the written description which follows.

BRIEF DESCRIPTION OF THE DRAWINGS

FIG. 5–B is a top view of the tubes and end plate of FIG. 5–A.

FIG. 5–C is a cross-sectional view taken along lines AA in FIG. 5–A.

DETAILED DESCRIPTION OF THE INVENTION

Figure 2:
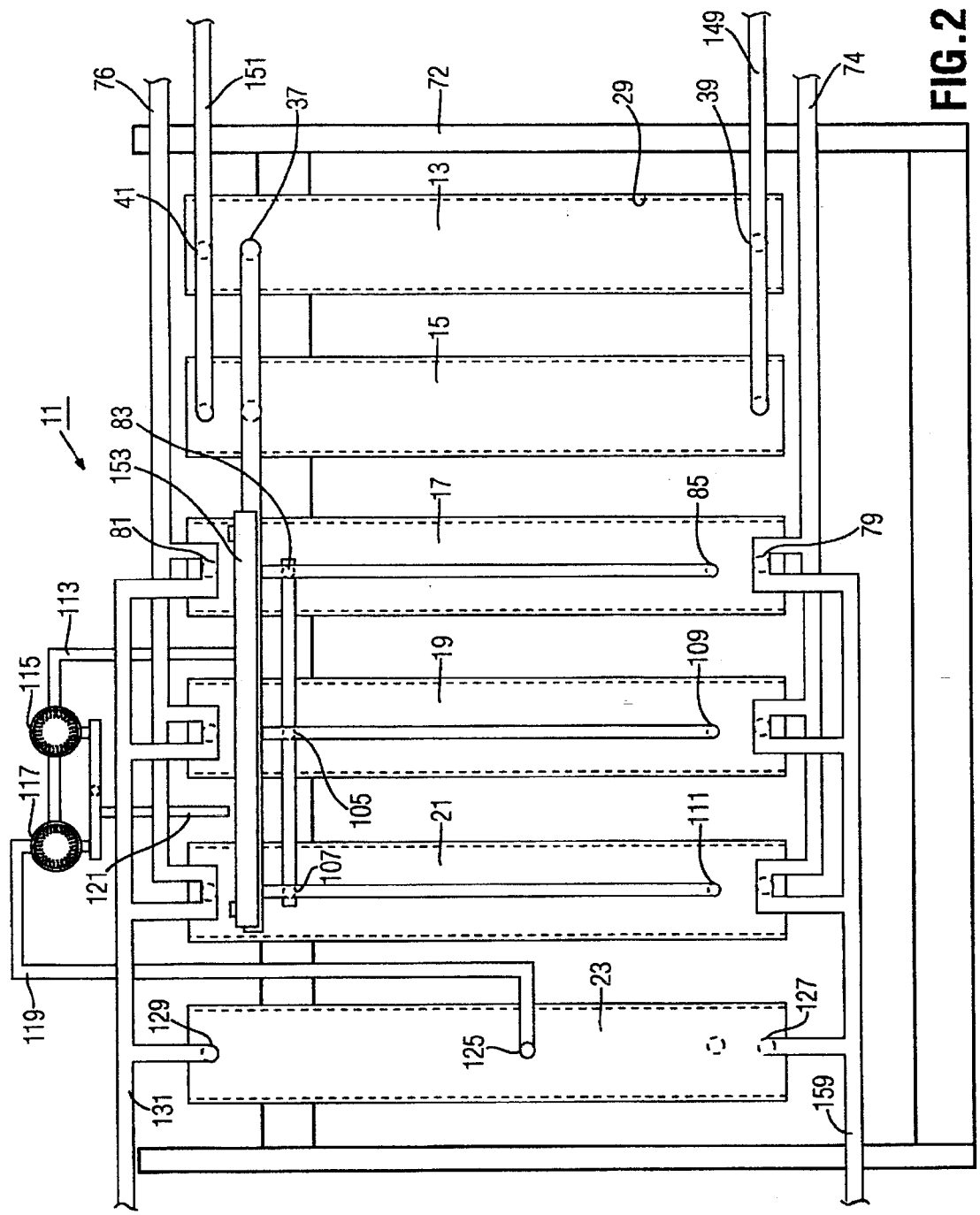
FIG. 2 is a front, perspective view of the absorption refrigeration system of the invention showing the principle components thereof.

The improved absorption refrigeration system of the invention is shown designated generally as 11 in FIG. 2. The system includes a plurality of vertically-oriented vessels of generally similar design including first and second evaporator units 13, 15, first absorber 17, a second absorber 19, a third absorber 21 and a condenser 23.

Figure 4:
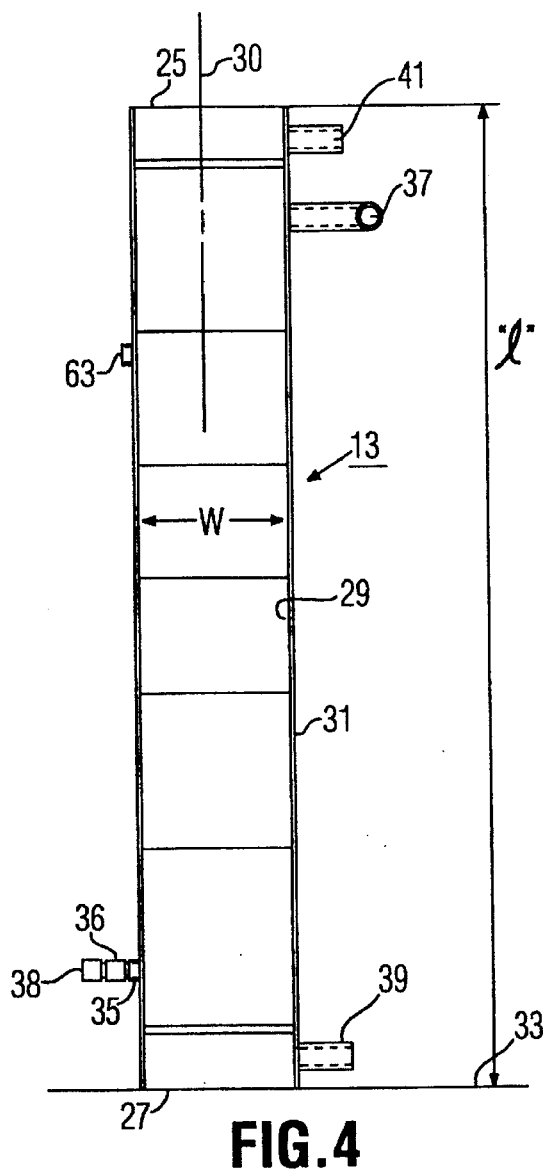
FIG. 4 is a side, isolated view of an evaporator unit of the absorption refrigeration system of FIG. 2.

As best seen in FIG. 4, each vessel, such as evaporator unit 13, is a vessel having a length "1" defined along a longitudinal axis (30 in FIG. 4) therebetween. Each vessel also has a width "w" which is less than the length "1", and initially open interior 29 and an exterior 31. The longitudinal axis 30 of each vessel is oriented vertically with respect to a surrounding support surface 33 when the vessels are in operation. The support surface could be the floor of a building upon which the vessels are supported by a suitable pipe stand or rack, or could form some portion of the interior compartment of a boat, as will be further explained.

Each of the evaporators 13, 15 includes an ammonia inlet 35, an ammonia low side outlet 37, a chill water inlet 39 and a chill water outlet 41. A solution probe 63 is also mounted on the vessel sidewall and communicates with the vessel interior 29 for detecting a solution level therein. The probe 63 could be, for example, any of a number of commercially available capacitance level probes.

Figure 5A:
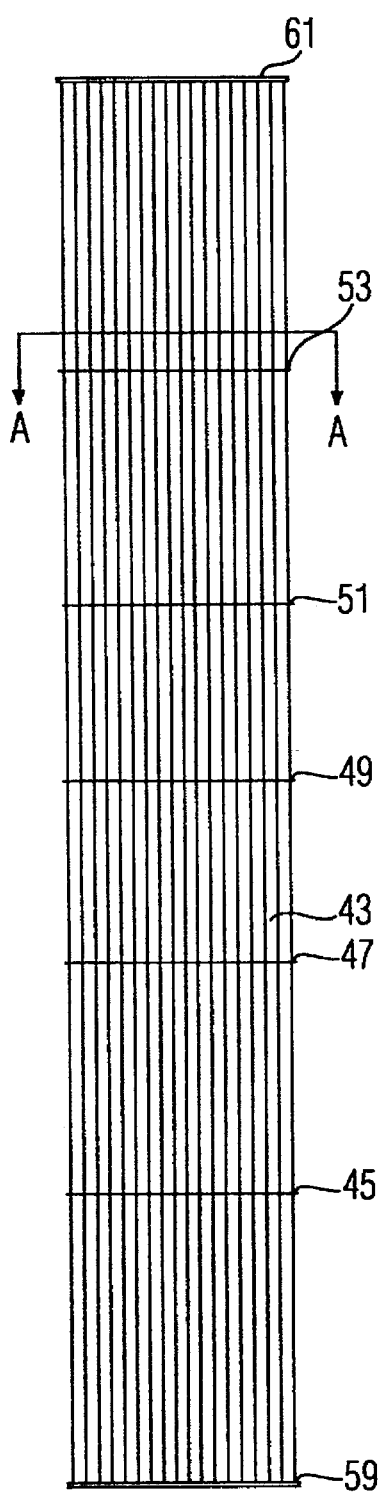
FIG. 5–A is a side, isolated view of the heat exchange tubes, baffles and end plates which are installed within the interior of the vessels used in the absorption refrigeration system of the invention.
Figure 5B:
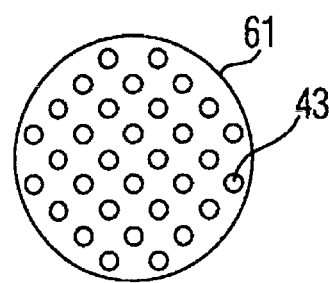
Figure 5C:
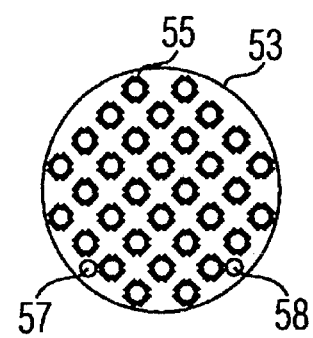

As shown in FIGS. 5a–5c, the interior of each vessel is filled with a plurality of longitudinally extending internal tubes 43 which run longitudinally between the bottom end 27 and top end 25 of the vessel. The internal tubes are supported in each vessel interior by means of a series of perpendicularly-arranged baffle plates 45, 47, 49, 51 and 53. In the preferred embodiment shown, there are thirty-two tubes of ½ inch diameter. The tubes are forty-eight inches long.

As shown in FIG. 5-c, the baffle plates 53 include a plurality of apertures 55, in addition to openings (57, 58 shown) for the longitudinally-extending tubes 43 in order to allow vapor to migrate through the baffle plates in an upward direction of travel through the vessel interior. Each tube bundle terminates in an end plate 59, 61 which is shown in top plan view in FIG. 5-b. The end plates contain openings for the internal tubes 43 but do not contain apertures in order to contain the ammonia vapor between the end plates within the vessel interior, as will be explained more fully.

The ammonia inlet 35 (FIG. 4) includes a variable restriction orifice 36 which determines the overall capacity of the unit and a solenoid valve 38 for cutting off the flow of ammonia to the vessel upon receiving the appropriate signal from the sensor probe 63. The chill water inlets 39 and outlets 41 for both evaporator units 13, 15 are arranged in parallel (FIG. 2).

As will be explained with reference to FIGS. 2 and 6, the absorption refrigeration system also includes an absorber section cyclable between an absorption state in which refrigerant vapor received from the evaporator unit is absorbed into a liquid absorbent to form a diluted absorbent with attendant heat generation, a heating state in which the diluted absorbent is concentrated by heating the same with a heating fluid to evaporate the refrigerant content thereof as a refrigerant vapor and an intermediate cooling state.

This is accomplished by having an absorber section which includes at least three absorbing/reclaiming units 17, 19, 21. Each unit is of a generally similar design to the evaporator design previously described. That is, as shown in FIG. 6, each absorber/reclaimer is a vessel having a top end 65, bottom end 67, and interior 69 and an exterior 71. Each unit also has a length defined along a longitudinal axis and a width which is less than the length. The absorbing/retaining units are also maintained in a vertical orientation by means of e.g., stand 72 (FIG. 2) with respect to the surrounding support surface of the environment. Each unit contains the tube bundle, baffle plate arrangement and end plate arrangement previously described. The baffle plates are indicated at 73 in FIG. 6 with the end plates being designated 75, 77. Although the exact tube arrangement may vary, depending upon the intended application, the described embodiment utilizes 32½ inch diameter tubes which are 48 inches long. The baffle plates are 16 gauge, stainless steel plates while the end plates are 3/16 inch stainless steel.

Figure 3:
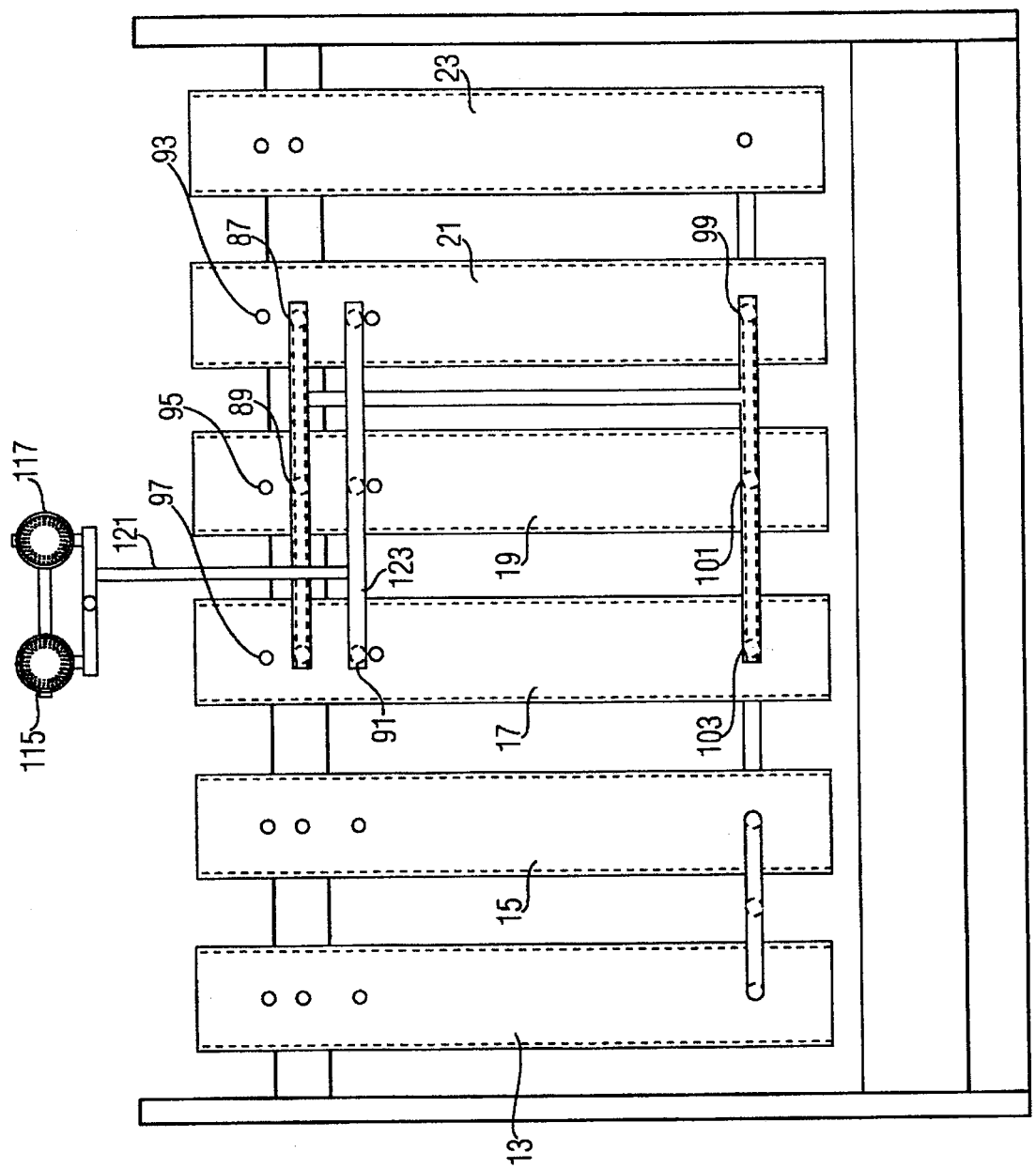
FIG. 3 is a perspective, back view, similar to FIG. 2 showing the components of the absorption refrigeration system of the invention.
Figure 6:
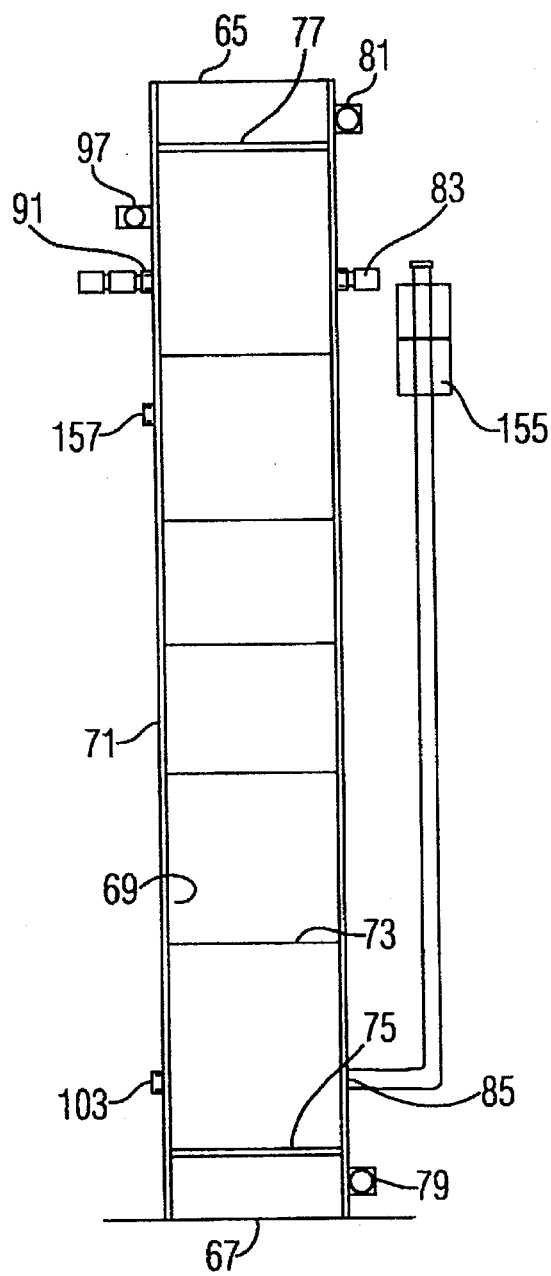
FIG. 6 is a side, isolated view of one of the absorber units used in the absorption refrigeration system of FIG. 2.

As shown in FIG. 6, each absorber includes, on its front side, a three-way valve at the entry points 79, 81 for hot or cold water. In the embodiment shown, each entry point has an associated "BLEMO" motor controlled valve which is switchable between a hot water position, a cold water position and an off position. Hot water is supplied to the system through an inlet conduit 74 (FIG. 2) which conducts hot water from an engine heat exchanger from the boat engine (139 in FIG. 1). Hot water is returned through an outlet conduit 76 to the boat engine keel cool system (to be described). The heat exchanger 140 can be any of a number of commercially available marine duty heat exchangers. In this application, a ten-inch diameter heat exchanger rated at 750,000 BTU's per hour was utilized. Cold water is supplied to the three-way valves by means of a condenser/absorber keel cool supply line 159 and returns via a condenser/absorber keel cool return line 131 (FIG. 2). Each absorber vessel (FIG. 6) also includes a vapor outlet 83 and an ammonia inlet 85 on the front side thereof. As shown in the back view of FIG. 3, each absorber has a rectifier drain inlet 87, 89, 91, a top purge manifold opening 93, 95, 97 and a bottom purge manifold opening 99, 101, 103. As shown in FIG. 2, absorbers 19 and 21 also have vapor outlets 105, 107 and ammonia inlets 109, 111 identified to those described with respect to the first absorbing/retaining unit 17.

The vapor outlets 83, 105, 107 are connected by a common discharge manifold 113 to a dual rectifier assembly 115, 117, which condenses and separates out water from ammonia vapor, the hot ammonia vapor passing through the exiting conduit 119 to the condenser 23. Condensed water is returned through a drain line 121 (shown broken away in FIG. 2) to a selected one of the drain inlets 87, 89, 91 (FIG. 3) which are fed by the rectifier drain manifold 123.

Figure 7:
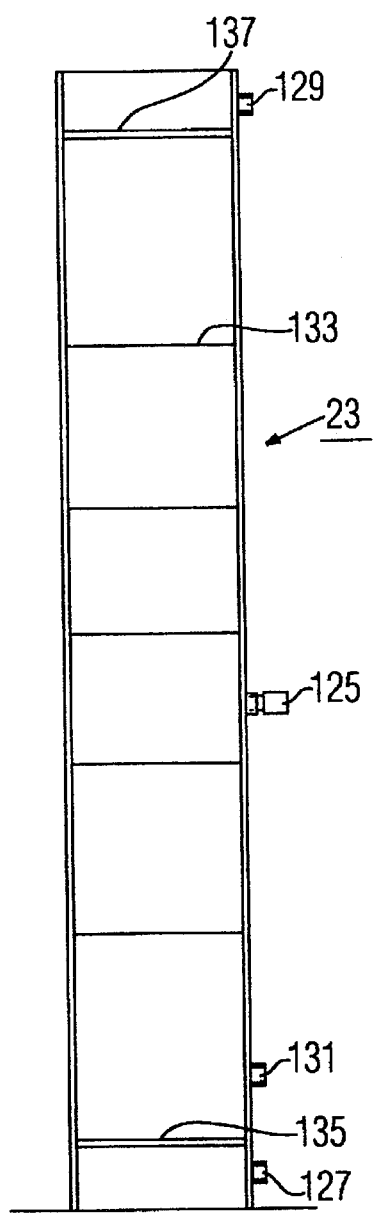
FIG. 7 is a side, isolated view of the condenser unit used in the absorption refrigeration system of the invention.

As shown in FIG. 7, the condenser section includes a condenser unit 23. The condenser unit 23 includes an inlet 125 for hot ammonia vapor leaving the rectifier section through the conduit 119 and includes an inlet 127 for condenser/absorber keel cool water and a water outlet 129 for returning condenser/absorber keel cool water through conduit 131 (FIG. 2) to the independent keel cool system of the boat. The condenser also includes an outlet conduit 131 for returning liquid, high pressure ammonia to the evaporator 13. As shown in FIG. 7, the condenser 23 is a vessel of similar construction to that previously described with an internal tube bundle described with respect to FIG. 5-a, internal baffles 133 and end plates 135, 137.

Figure 1:
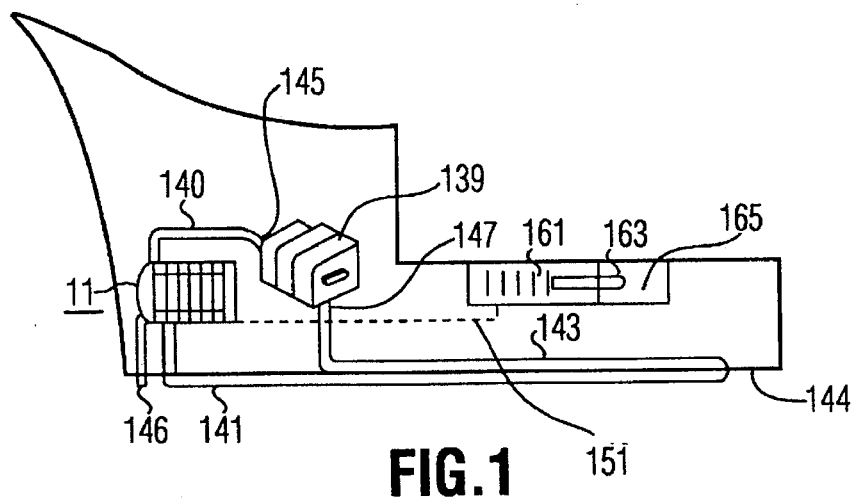
FIG. 1 is a simplified, schematic view of a fishing boat showing the engine and keel cool system which is used with the improved absorption refrigeration system of the invention.

FIG. 1 shows, in simplified fashion, a fishing boat, such as a shrimp trawler, having a conventional diesel engine 139. The diesel engine is cooled by circulating water through a conventional keel cool system, the system being made up of an outgoing loop portion 141 and a return loop portion 143 which are arranged along a bottom exterior surface 144 of the boat. In the embodiment shown, hot water exiting from an engine heat exchanger 140 mounted on the engine exhaust is routed to the absorption refrigeration system 11 to supply heat to the system through inlet 74. Hot water exists the system through outlet conduit 76 and is returned through engine keel cool loop 143 to the boat engine 139. The loops 141, 143 are a total of 300 feet in length and are two-inch diameter pipe. As will be explained more fully, heat is supplied from the engine exhaust to the absorption refrigeration system in order to heat the selected absorbing/reclaiming unit 17, 19, 21 which is in the "heating" state, utilizing the exhaust heat from the boat engine and thereby eliminating the need for a separate generator portion of the absorption refrigeration system apart from the boat engine exhaust heat.

The system of the invention also includes a separate and independent keel cool system from the diesel engine keel cool system previously described. The condenser/absorber keel cool system includes an outgoing loop (shown broken away as 146 in FIG. 1) and a return loop (not shown) identical to that described with respect to loops 141, 143 of the engine keel cool system. The absorber/condenser keel cool system is used to supply cool water through inlet conduit 159 to the system and to return cold water through outlet 131 (FIG. 2).

The operation of the improved absorption refrigeration system of the invention will now be described with reference primarily to FIG. 2. Liquid ammonia at about 213.9 pounds pressure (105° F.) enters the restriction valve 35 of the pair of evaporators 13, 15. Chill water is being circulated through the inlet and outlet conduits 149, 151 through the internal tubes of the vessels 13, 15. As the chill water flows up the internal tubes and out the chill water outlet 41, the ammonia refrigerant entering the inlet 35 is flashed off and boils (at 15.6 pounds pressure, equivalent to 0° F.) within the vessels 13, 15 and migrates upwardly through the baffle plates 45, 47, 49, 51, 53 (FIG. 5-a). The vertical arrangement of the longitudinal tanks and baffle arrangement allows the system to work at as much as a 25° angle from vertical or more while preventing slosh within the vessels.

As refrigerant starts to stack up within the evaporator interior 29, the sensor probe 63 (FIG. 4) is activated and closes the solenoid valve present in the inlet 35 to the unit. At this point, the chill water being circulated through the conduits 149, 151 is approaching 0° F. and closing the solenoid valve stops the refrigeration effect. Both evaporators work simultaneously in identical fashion with the water inlets and outlets being arranged in parallel. The presently-designed system can easily provide a 15-ton refrigeration capacity, or more, at the pressure and temperatures for the ammonia/water refrigerant system described.

The absorber units 17, 19, 21 are fed ammonia vapor through the manifold 153 and through the ammonia inlets 85, 109, 111 shown in FIG. 2. Assume first that the solenoid valve 155 in FIG. 6 is opened allowing ammonia vapor to pass through the inlet 85 to the interior of the first absorber where ammonia vapor is absorbed in water and gradually builds up to the solution probe 157. The solution probe switches off the solenoid valve 155 and energizes the solenoid for the next absorber 19. As has been described, a three-way valve 79, 81 is present on the bottom and top of each absorber for selectively admitting either hot or cold water to the vessel tubes within the vessel interior for indirect heat exchange with the ammonia/water. When hot water is admitted to the vessel tubes from the engine heat exchanger conduit 74, ammonia is boiled out of the water absorbent and passes through the vapor outlet 83 (FIG. 2) and through the discharge manifold 113 and rectifier section 115, 117. Any moisture condensed by the rectifier section passes through the drain line 121 and is reintroduced to the evaporator which is in the "heating" state through the manifold (123 in FIG. 3).

As absorber number 17 is saturated with ammonia, exhaust heat from the engine hot water is drawn through the absorber to drive ammonia vapor out as a high pressure vapor where it is passed from the rectifier to condense the vapor as a high pressure liquid. At this point, ammonia inlet 85 is closed and ammonia inlet 111 (on absorbing/retaining unit 21) is opened to allow ammonia vapor to be admitted into unit 21 which has no ammonia content at this point. While this is happening, heat from absorber unit 17 is transferred to absorber unit 19 by opening and closing the appropriate three-way valves 79, 81. This action begins to cool absorber unit 17 while absorber unit 21 is drawing ammonia. At this point, absorber number 19 is heating, absorber number 17 is cooling and absorber number 21 is beginning to absorb ammonia and act in the reclaim state. Thus, the three absorber units allow a cyclable effect in which one absorber is always heating, one is always cooling and one is always absorbing or reclaiming.

As has been described, the hot ammonia vapor passing through conduit 119 and inlet 125 is condensed in condenser unit 23 by indirect contact with the condenser/absorber keel cool water passing from conduit 159 to inlet 127 to outlet 129 and through the internal heat exchange tubes of the condenser. The hot, liquid ammonia is returned to the evaporator units to repeat the cycle.

The chill water exiting the evaporators through outlet conduit 151 can be used for any desired refrigeration or air conditioning effect, depending upon the end application desired. In the preferred embodiment of a fishing boat, the exiting cold water would pass through a series of cold plates 161 in FIG. 1 of conventional design located in the hold area of the boat. In the preferred embodiment, the cold plates are eight inches tall and one inch thick and twenty-four plates are arranged over as twelve-foot length in the assembly. The heat transferred from these cold plates keeps the hold temperature of the boat at approximately 0° F. Chilled water is also passed through a conventional marine duty heat exchanger 163 in a brine tank 165 at the rear of the boat in order to flash-freeze shrimp before placing the shrimp into the hold of the boat. In this application, a heat exchanger with a 2" diameter header 38" tall with 99 pieces of ⅜" tubing 56" long is immersed in the brine tank solution.

An invention has been described with several advantages. The improved absorption refrigeration system of the invention is simple in design and economical to manufacture. The majority of the vessels utilized in the system are of similar or identical design, adding to the ease of manufacture. The vessels are mounted in an upright or vertical position which saves space and, because of the unique baffle arrangement can be tilted at as much as a 25° angle or more without affecting the system operation. The improved absorption refrigeration system of the invention does not utilize a conventional generator heat source, such as a gas burner, but rather utilizes the exhaust heat of the diesel engine of the boat. Since there is no conventional generator in the system, there is no need for a flame or electric energy source or for a mechanical compressor which would have moving parts which would need replacement or repair. The system is highly efficient and can maintain a desired space on the boat at 0° F. or below for an extended period of time.

While the invention has been shown in only one of its forms, it is not thus limited but is susceptible to various changes and modifications without departing from the spirit thereof.

What is claimed is:

1. An improved absorption refrigeration system, comprising:

an evaporator section in which a refrigerant caused to evaporate in an evaporator unit to form refrigerant vapor by depriving a chill carrier fluid of its heat;

an absorber section comprised of at least three absorbing/reclaiming units, each absorbing/reclaiming unit being cyclable between:

a) an absorption state in which the refrigerant vapor received from the evaporator unit is absorbed into a liquid absorbent to form a diluted absorbent;

b) a heating state in which the diluted absorbent is concentrated by heating the same by indirect contact with a heating fluid in heat exchange relationship to evaporate the refrigerant content thereof as a high pressure vapor;

c) a cooling state for absorbing the heat generated by another of the three absorbing/reclaiming units when that another unit is in the heating state;

a condenser section for condensing the high pressure vapor received thereinto from the absorbing/reclaiming unit previously in the heating state, whereby the condensed vapor is transformed to a high pressure liquid which is returned to the evaporator unit in a closed loop absorption refrigeration cycle;

wherein each of the absorbing/reclaiming units is a vessel having a vessel interior and wherein each vessel interior contains a plurality of internal tubes which run longitudinally between the bottom end and top end thereof, the internal tubes being supported in each vessel interior by means of a series of perpendicularly arranged baffle plates, the baffle plates having apertures therein for allowing the passage of vapor within the vessel interior as a heat exchange fluid passes through the tubes.

2. An improved refrigeration system for a boat having a boat engine, the boat being afloat in a body of water, the system being capable of cooling a desired area of the boat to at least 0 degrees F., the improved refrigeration system comprising:

an absorption refrigeration system including an evaporator section in which a refrigerant is caused to evaporate in an evaporator unit to form a refrigerant vapor by depriving a chill carrier fluid of its heat;

an absorber section comprised of at least three absorbing/reclaiming units, each absorbing/reclaiming unit being cyclable between:

(a) an absorption state in which the refrigerant vapor received from the evaporator unit is absorbed into a liquid absorbent to form a diluted absorbent;

(b) a heating state in which the diluted absorbent is concentrated by heating the same by indirect contact with a heating fluid in heat exchange relationship to evaporate the refrigerant content thereof as a high pressure vapor;

(c) a cooling state for absorbing the heat generated by another of the three absorbing/reclaiming units when that another unit is in the heating state;

a condenser section for condensing the high pressure vapor received thereinto from the absorbing/reclaiming unit previously in the heating state, whereby the condensed vapor is transformed to a high pressure liquid which is returned to the evaporator unit in a closed loop absorption refrigeration cycle;

wherein heat is supplied to the absorption refrigeration system in order to heat the absorbing/reclaiming unit which is in the heating state by utilizing exhaust heat from the boat engine; and wherein the boat engine has a keel cool outlet and a keel cool return for circulating cooling water from the boat engine along a keel cool line running along a bottom exterior surface of the boat, and wherein exhaust engine heat is routed to the absorption refrigeration system to supply heat to the system and wherein hot water exiting from the absorption refrigeration system is routed through the keel cool line back to the keel cool return, thereby removing heat from the water.

3. The improved refrigeration system of claim 2, wherein each of the absorbing/reclaiming units is a vessel having a top end and a bottom end and a length defined along a longitudinal axis therebetween, a width which is less than the length, an initially open interior and an exterior, and wherein the longitudinal axis of the vessel is oriented vertically with respect to the bottom exterior surface of the boat when in operation.

4. An improved refrigeration system for a boat having a boat engine, the boat being afloat in a body of water, the system being capable of cooling a desired area of the boat to at least 0 degrees F., the improved refrigeration system comprising:

an absorption refrigeration system including an evaporator section in which a refrigerant is caused to evaporate in an evaporator unit to form a refrigerant vapor by depriving a chill carrier fluid of its heat;

an absorber section comprised of at least three absorbing/reclaiming units, each absorbing/reclaiming unit being cyclable between:

(a) an absorption state in which the refrigerant vapor received from the evaporator unit is absorbed into a liquid absorbent to form a diluted absorbent;

(b) a heating state in which the diluted absorbent is concentrated by heating the same by indirect contact with a heating fluid in heat exchange relationship to evaporate the refrigerant content thereof as a high pressure vapor;

(c) a cooling state for absorbing the heat generated by another of the three absorbing/reclaiming units when that another unit is in the heating state;

a condenser section for condensing the high pressure vapor received thereinto from the absorbing/reclaiming unit previously in the heating state, whereby the condensed vapor is transformed to a high pressure liquid which is returned to the evaporator unit in a closed loop absorption refrigeration cycle;

wherein heat is supplied to the absorption refrigeration system in order to heat the absorbing/reclaiming unit which is in the heating state by utilizing exhaust heat from the boat engine;

wherein the boat engine has a keel cool outlet and a keel cool return for circulating cooling water from the boat engine along a keel cool line running along a bottom exterior surface of the boat, and wherein exhaust engine heat is routed to the absorption refrigeration system to supply heat to the system and wherein hot water exiting from the absorption refrigeration system is routed through the keel cool line back to the keel cool return, thereby removing heat from the water; and wherein each of the absorbing/reclaiming units is a vessel having a vessel interior and wherein the vessel interior contains a plurality of internal tubes which run longitudinally between the bottom end and top end thereof, the internal tubes being supported in each vessel interior by means of a series of perpendicularly arranged baffle plates, the baffle plates having apertures therein for allowing the passage of vapor within the vessel interior as a heat exchange fluid passes through the tubes.

5. The improved absorption refrigeration system of claim 4, wherein the refrigerant vapor is ammonia and the absorbent liquid is water.

6. A method of refrigerating a desired area of a boat, the boat having a boat engine and being afloat in a body of water, the boat engine being cooled by means of a keel cool outlet and a keel cool return for circulating cooling water from the boat engine along a keel cool line running along a bottom exterior surface of the boat, the refrigeration system being capable of cooling the desired area of the boat to at least 0 degrees F., the method comprising the steps of:

installing an absorption refrigeration system on the boat including:

an evaporator section in which a refrigerant is caused to evaporate in an evaporator unit to form a refrigerant vapor by depriving a chill carrier fluid of its heat;

an absorber section comprised of at least three absorbing/reclaiming units, each absorbing/reclaiming unit being cyclable between:

(a) an absorption state in which the refrigerant vapor received from the evaporator unit is absorbed into a liquid absorbent to form a diluted absorbent;

(b) a heating state in which the diluted absorbent is concentrated by heating the same by indirect contact with a heating fluid in heat exchange relationship to evaporate the refrigerant content thereof as a high pressure vapor;

(c) a cooling state for absorbing the heat generated by another of the three absorbing/reclaiming units when that another unit is in the heating state;

a condenser section for condensing the high pressure vapor received thereinto from the absorbing/reclaiming unit previously in the heating state, whereby the condensed vapor is transformed to a high pressure liquid which is returned to the evaporator unit in a closed loop absorption refrigeration cycle; and wherein heat is supplied to the absorption refrigeration system in order to heat the absorbing/reclaiming unit which is in the heating state by utilizing exhaust heat from the boat engine, thereby eliminating the need for a separate generator portion of the absorption refrigeration system apart from the boat engine exhaust heat.

7. The method of claim 6, wherein exhaust engine heat is routed to the absorption refrigeration system to supply heat to the system and wherein hot water exiting from the absorption refrigeration system is routed through the keel cool line back to the keel cool return.

8. The method of claim 7, wherein the refrigerant vapor is ammonia and the absorbent liquid is water.

9. The method of claim 8, wherein the boat is a fishing boat and the desired area which is cooled is a hold of the boat which contains freshly caught fish.

10. The method of claim 9, wherein the hold is maintained at a temperature of about 0 degrees F. or below.

* * * * *